United States Patent [19]

Kost et al.

[11] Patent Number: 5,636,910
[45] Date of Patent: Jun. 10, 1997

[54] SYSTEM AND METHOD FOR CONTROLLING THE DYNAMICS OF VEHICLE MOVEMENT

[75] Inventors: Freidrich Kost; Karl-Josef Weiss, both of Stuttgart, Germany

[73] Assignee: Robert Bosch GmbH, Stuttgert, Germany

[21] Appl. No.: 521,753

[22] Filed: Aug. 31, 1995

Related U.S. Application Data

[63] Continuation of Ser. No. 374,428, Jan. 19, 1995, abandoned, which is a continuation-in-part of Ser. No. 118,824, Sep. 19, 1993, abandoned.

[30] Foreign Application Priority Data

Sep. 10, 1992 [DE] Germany ............ 42 20 240.4

[51] Int. Cl.$^6$ ............................................. B60T 8/58
[52] U.S. Cl. ............... 303/155; 303/115.4; 364/426.023
[58] Field of Search ........................ 303/3, 10, 11, 303/15, 20, 115.4, 155, 156, 157, 158, 166, DIG. 1–4; 364/426.02

[56] References Cited

U.S. PATENT DOCUMENTS

| | | | |
|---|---|---|---|
| 4,538,228 | 8/1985 | Brearey et al. | 364/426 |
| 4,805,105 | 2/1989 | Weiss et al. | 364/424.02 |
| 4,930,845 | 6/1990 | Bleckmann et al. | 303/100 |
| 5,136,509 | 8/1992 | Van Zanten et al. | 303/95 X |
| 5,207,484 | 5/1993 | Bleckmann et al. | 303/110 |

FOREIGN PATENT DOCUMENTS

| | | |
|---|---|---|
| 0381957A1 | 8/1990 | European Pat. Off. . |
| 3809099A1 | 9/1989 | Germany . |
| 3809100A1 | 9/1989 | Germany . |
| 4030724A1 | 4/1992 | Germany . |

Primary Examiner—Lee W. Young
Attorney, Agent, or Firm—Spencer & Frank

[57] ABSTRACT

A system and method for controlling brake pressure is described wherein desired brake pressures are determined. From these pressures, valve activation control times are calculated and thus the pressure is directed into the wheel brake cylinders. The wheel brake cylinder pressures are determined from the activation times of the valves and the brake circuit pressure. They are also used for determining the desired pressure. In addition a pump is provided which makes it possible to generate higher pressures in the wheel brake cylinders than those actuated by the driver. The brake circuit pressures required for the above-described determination of the desired pressure are determined by calculating a model and using the measured inlet pressure.

8 Claims, 3 Drawing Sheets

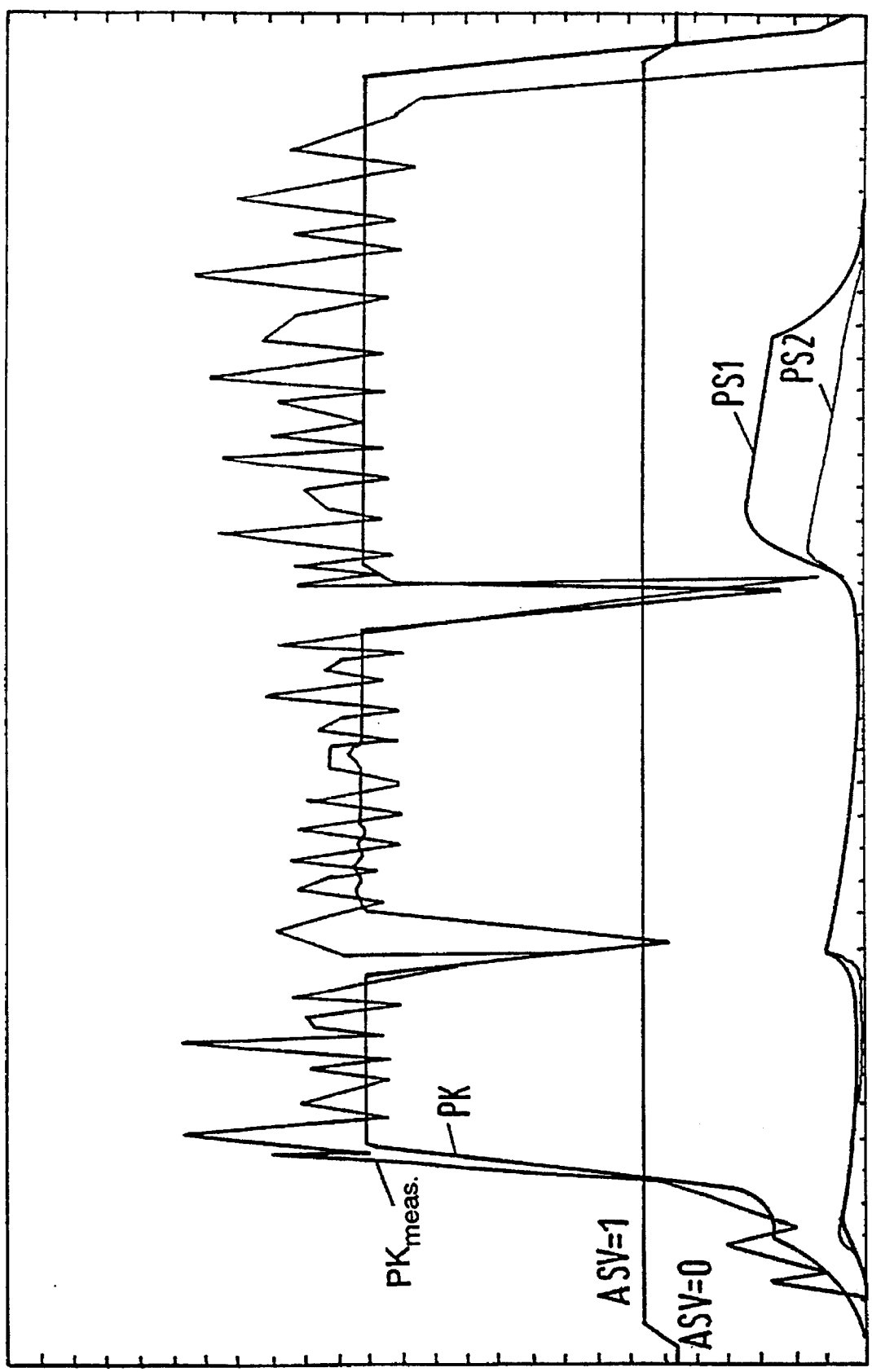

SYSTEM AND METHOD FOR CONTROLLING THE DYNAMICS OF VEHICLE MOVEMENT

CROSS REFERENCE TO RELATED APPLICATION

This application is continuation of U.S. application Ser. No. 08/374,428, filed Jan. 19, 1995, now abandoned, which in turn is a continuation in part of U.S. application Ser. No. 08/118,824 filed Sep. 10, 1993, now abandoned, the subject matter of which is incorporated herein by reference.

This application claims the priority of patent application Ser. No. P 4,230,240.4-21, filed Sep. 10, 1992 in the Federal Republic of Germany, the subject matter of which is incorporated herein by reference.

BACKGROUND OF THE INVENTION

The present invention relates to a method and apparatus for controlling the brake pressure of the wheels of a brake circuit of a brake control system using measured and estimated values.

German published application DE-A1 4,030,724 discloses a system for controlling the dynamics of vehicle movement, including an ABS (antilock brake system) in which, based on measured and estimated values including the brake cylinder pressures, desired brake pressures are determined for the wheel brake cylinders, activation times for the vehicle hydraulic system including inlet valves are determined from the desired brake circuit pressures using an inverse hydraulic model, and the actual brake cylinder pressure is estimated from the brake circuit pressure and the activation times of the inlet and outlet valves associated with the individual brakes using a hydraulic model.

In this reference, the braking pressure in the wheel brake cylinder is estimated from the measured inlet pressure (=brake circuit pressure) and the valve activating times (Inlet pressure=brake circuit pressure).

SUMMARY OF THE INVENTION

According to a first preferred aspect of the invention, in a brake pressure control system including: means for determining desired brake pressure values ($P_{des}$) for wheel brake cylinders of a brake circuit of a vehicle brake pressure hydraulic system on the basis of measured and estimated values including brake cylinder pressure values (PS), inverse hydraulic model means, which responsive to the desired brake pressure values ($P_{des}$), for determining actuation times (UK) for pressure inlet valves for the wheel brake cylinders, and hydraulic model means for providing estimated values (PS) of the actual brake cylinder pressure for a respective brake circuit from a determined brake circuit pressure (PK) and from the activation times of the inlet and valves associated with the individual brake cylinders of a respective brake circuit, a pump is provided in the hydraulic system for the production of the brake circuit pressure, with the pump being set into action if pressure build-up is required and then delivering a constant volume flow; and means are provided for estimating the brake circuit pressure (PK) for each brake circuit in accordance with the relationship $$PK_{k+1} = PK_k + a_1 - a_2 * UK1(PK_k - PS1_k) - a_3 * UK2(PK_k - PS2_k) + P_{inl}$$

if pressure build-up is required in at least one of the two wheel brakes of a brake circuit, and otherwise according to the relationship $$PK_{k+1} = a_4 * PK_k + a_5 + P_{inl}$$

with this relationship being applicable to at least one of the two wheel brakes, and with UK1 and UK2 being the determined valve activation times of the respective inlet valves forming part of the brake circuit, PS1 and PS2 being the estimated actual pressures in the associated wheel brake cylinders, $P_{inl}$ being the measured brake cylinder pressure applied by a driver of the vehicle, $a_1$ to $a_5$ being vehicle specific constants, and k being the time.

According to a further preferred aspect of the invention, in a method of controlling brake pressure at two wheel cylinders of a brake circuit of a vehicle, which method includes determining desired brake pressure values for the respective wheel brake cylinders based on measured and estimated values including estimated actual values of the wheel brake cylinder pressures, and estimating the actual values of the wheel brake cylinder pressures from a brake circuit pressure PK and activation times of inlet valves associated with the individual brakes of the brake circuit; the improvement which comprises providing and controlling a pump for the production of the brake circuit pressure, with said pump being set into action if pressure build-up is required and then delivering a constant volume flow in the respective brake circuit; and estimating the brake circuit pressure PK for each brake circuit in accordance with the relationship $$PK_{k+1} = PK_k + a_1 - a_2 * UK1(PK_k - PS1_k) - a_3 * UK2(PK_k - PS2_k) + P_{inl}$$

if pressure build-up is required in at least one of the two wheel brakes of the respective brake circuit, and otherwise according to the relationship $$PK_{k+1} = a_4 * PK_k + a_5 + P_{inl}$$

wherein UK1 and UK2 are valve activation times of the respective inlet valves forming part of the brake circuit, PS1 and PS2 are the estimated actual pressure values in the associated wheel brake cylinders, $P_{inl}$ is a measured brake cylinder pressure provided by a driver of the vehicle, $a_1$ to $a_5$ are vehicle specific constants, and k is a time. According to a modification of the invention, the relationship for pressure buildup is expanded by the term $+a_6 PK^2_k$.

ADVANTAGES OF THE INVENTION

The use of a pump makes it possible to actuate higher brake pressures than given by the driver or to generate pressure without actuation of the brake. Nevertheless, in the invention, only the inlet pressure is required as a measured value. Further sensors for measuring pressure are not required. Moreover, the estimation of brake circuit pressures according to the invention results in more accurate estimates than in the prior art, since the reactive effect of the changes in pressure in the wheel brake cylinders on the brake circuit pressure is detected by means of the employed model.

BRIEF DESCRIPTION OF THE DRAWINGS

One embodiment of the invention is elucidated by way of the drawing.

FIG. 3 is a diagram used to explain the invention.

DETAILED DESCRIPTION OF THE PREFERRED EMBODIMENTS

Figure 1:
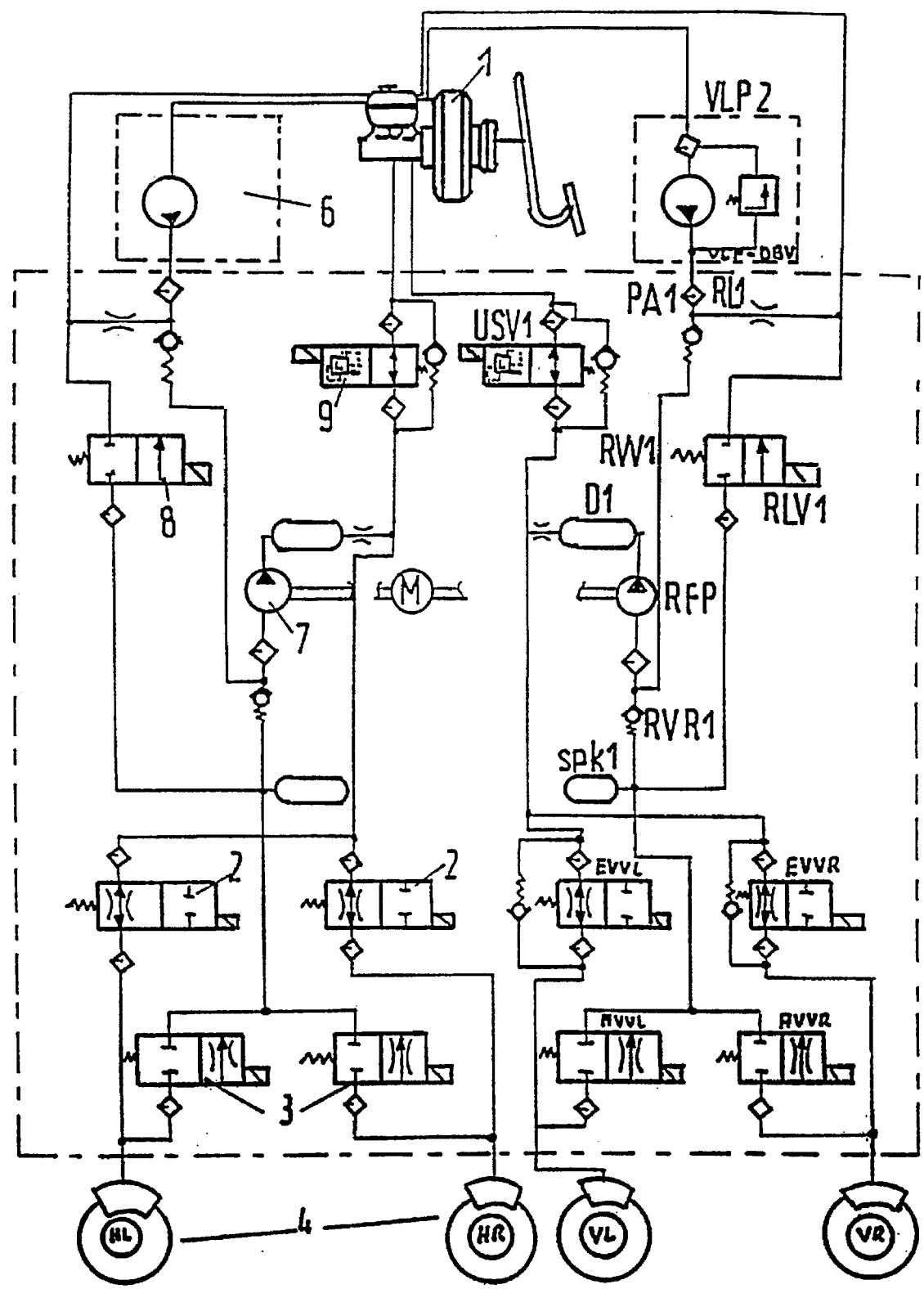
FIG. 1 schematically shows a type of hydraulic system which may be used with the invention.

Reference numeral 1 in FIG. 1 designates a main brake cylinder to which two brake circuits are connected. Each brake circuit includes an inlet valve 2 and an outlet valve 3 for each wheel 4 of the brake circuit, a pre-charge pump 6, a return pump 7, a return valve 8 and a change-over valve 9. If the brake pressure is to be built up at the wheels 4 without activating the main brake cylinder 1, the pre-charge pump 6 which is then effective together with return pump 7 produces a brake pressure upstream of the inlet valves 2. The return valve 8 and the change-over valve 9 are then under current, i.e., in their second switching position.

It is now possible to direct the desired brake pressure into the wheel brakes by means of the inlet valves 2 and outlet valves 3.

Figure 2:
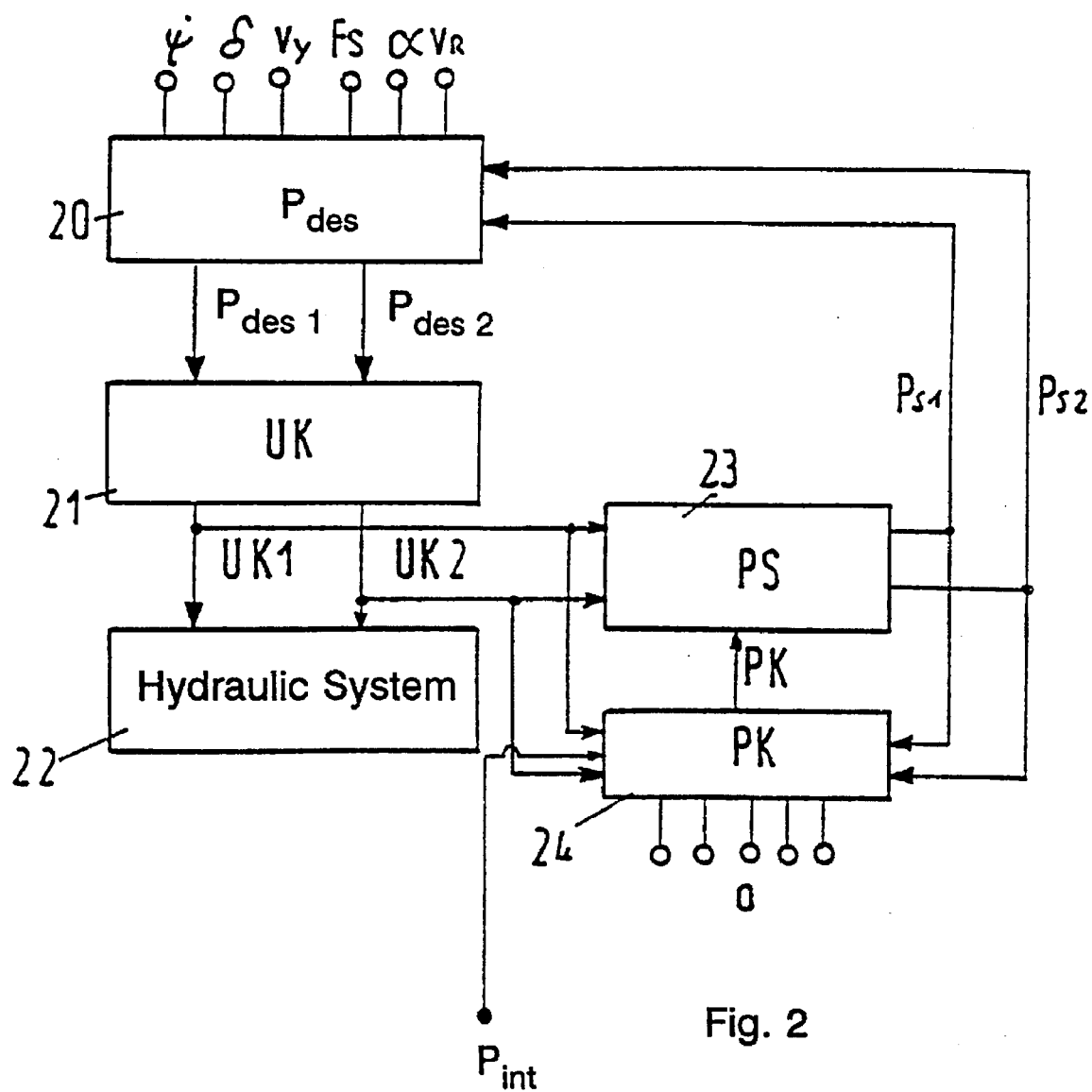
FIG. 2 is a block circuit diagram of a control unit according to the invention.

FIG. 2 shows a block 20, which, according to DE-A1 4,030,724 now produces desired brake pressures $P_{des}$ from measured and estimated values of yaw speed $\psi$, steering angle $\delta$, transverse speed $V_y$, lateral forces $F_s'$, angle of inclination $\alpha$, wheel or brake cylinder pressures PS and rotational speeds VR for the wheels of a brake circuit ($P_{des1}$ and $P_{des2}$ brake circuit distribution, as desired). A block 21 generates valve control signals UK1 and UK2 of corresponding length for the respective brake circuits from these desired pressures $P_{des1}$ and $P_{des2}$ on the basis of an inverse hydraulic model. These control signals UK1 and UK2 are directed to a hydraulic system 22 containing the valves for the brake control system.

These control signals UK1 and UK2 are also directed to a block 23 which estimates the brake cylinder pressures PS1 and PS2 from the activating times UK and the brake circuit pressure PK according to a hydraulic model. These brake cylinder pressures PS1 and PS2 are supplied to block 20 and taken into consideration in calculating the desired brake pressures $P_{des}$. Thus, no direct comparison between the desired and actual brake pressure values is intended.

A further block 24, to which the valve activation signals UK1 and UK2, the inlet pressure $P_{inl}$ given by the driver of the vehicle, and the brake cylinder pressures PS1 and PS2 are supplied, and to which vehicle-specific constants a1 to $a_5$ are fed, estimates the brake circuit pressure PK, and supplies a corresponding signal to block 23. The block 24 estimates the brake circuit pressure PK as follows (where k is the time):

$$PK_{k+1}=PK_k+a_1-a_2*UK1(PK_k-PS1_k)-a_3*UK2(PK_k-PS2_k)+P_{inl}$$

if pressure buildup is required in at least one of the two wheel brakes of the brake circuit, and otherwise according to the relationship $$PK_{k+1}=a_4*PK_k+a_5+P_{inl}$$

As an example, the model for calculating the circuit pressure for the rear axle is used and is described below. However, for the front axle, the same model is employed with other parameters.

The following values are used:
ASV2=1 the rear pre-charge pump 6 and the automatic suction return pump 7 are turned on, and the return valve 8 and the change-over valve 9 are under current;
ASV2=0 the rear pre-charge pump 6 and the automatic suction return pump 7 are turned off; and the two valves 8 and 9 are without current;
$PK2_k$ rear circuit pressure at time k;
$V_p$ volume flow conducted by the pumps; a computational intermediate value;
V__HL volume flow into the left rear wheel brake cylinder; a computational intermediate value;
V__HR volume flow into the right rear wheel brake cylinder; a computational intermediate value;

PO2 opening pressure of the pressure-limiting valve of the change-over valve 9;
$P_{inl}$ the driver-given measured pressure of the main brake cylinder (inlet pressure).

The equation below describes the change in pressure of the rear brake circuit:

$$PK2_{k+1}-PK2_k=k_1*V_p-k_2*V\_HL-k_3*V\_HR \quad (1)$$

The volume flowing in the wheel brake cylinder may be estimated as follows:

$$V\_HL=k_4*UK\_HL*(PK2_k-PM\_HL_k)$$

$$V\_HR=k_5*UK\_HR*(PK2_k-PM\_HR_k)$$

where $k_i$: constants; they are computational intermediate values;

UK__Hx: activation time of the respective EV (inlet) valves 2 of the rear wheels where x=L or R.

PM__Hx: measured pressures in the respective wheel brake cylinders of the rear wheels.

Since no measured wheel cylinder pressures are available, the estimated wheel cylinder pressures PS__x from block 23 are used.

Assuming that the volume flow of the pumps is constant, the model whose parameters are linear is obtained for the estimate of the circuit pressure:

$$PK2_{k+1}=PK2_k+a_1-a_2*UK\_HL(PK2_k-PS\_1_k)-a_3*UK\_HR*(PK2_k-PS\_2_k)+P_{inl} \quad (2)$$

where $$P_{inl} \leq PK2_{k+1} \leq P_{inl}+PO2$$

where  $a_1 = k_1*V_p$    $a_1 > 0$    for example, 30.0
        $a_2 = k_2*k_4$    $a_2 > 0$    for example, 0.0125
        $a_3 = k_3*k_5$    $a_3 > 0$    for example, 0.0125

The estimated portion is superposed on the inlet pressure $P_{inl}$ if such an inlet pressure exists (braking is taking place).

Equation (2) is used only if ASV2 has the value of 1, i.e., if the circuit pressure is actively increased.

If the pumps are turned off (ASV2=0), the circuit pressure is calculated by way of the following relationship:

$$PK2_{k+1}=a_4*PK2_k30 \; a_5+P_{inl} \quad (3)$$

where   $0 < a_4 < 1$    for example, 0.3
          $a_5 < 0$    for example, −0.1 where $$PK2_k \geq P_{inl}$$

The parameters $a_i$ may be predetermined by means of suitable methods for identification. In these parameters all values such as sampling time, pump performance, cross sections of the throttle and of the line, etc. are combined.

The order of Equations (2) and (3) can be increased in order to better describe non-linearities in the lower pressure region. For example, expansion of Equation (2) results in the following:

$$PK2_{k+1} = PK2_k + a_1 - a_2 * UK\_H2 \, (PK2_k - PS\_1_k) - a_3 * UK\_Hr * (PK2_k - PS\_2_k) + (a_6 \, PKZ_k^2) + P_{inl}$$

FIG. 3 shows both the two wheel brake cylinder pressures PS1 and PS2 and the measured and estimated rear axle circuit pressure $PK_{meas}$ and PK during an ASC engagement within the control of movement dynamics.

When the pumps are turned on (ASV2=1), the estimated brake circuit pressure follows the measured brake circuit pressure. As soon as the inlet valves block (UK=0), the change in brake circuit pressure is determined only by the volume conveyed by the pumps, and this is reflected in the steeper pressure gradients during brake circuit pressure build-up.

The pressure rises until the pressure limiting valve opens at a predetermined pressure, and this pressure can thus not be exceeded.

If, due to the wheel control, a greater build-up of pressure is required in the wheel brake cylinders, the corresponding volume flows into them and the circuit pressure drops significantly.

This behavior is also very well described by the model.

It will be understood that the above description of the present invention is susceptible to various modification, changes an adaptations, and the same are intended to be comprehended within the meaning and range of equivalents of the appended claims.

What is claimed is:

1. In a vehicle brake pressure control system including: means for measuring the inlet brake cylinder pressure ($P_{inl}$) applied by a driver of the vehicle; means for determining desired actual brake pressure values ($P_{des}$) for wheel brake cylinders of a brake circuit of a vehicle brake pressure hydraulic system on the basis of measured and estimated values including actual brake cylinder pressure values (PS); inverse hydraulic model means, responsive to the desired actual brake pressure values ($P_{des}$), for determining actual actuation times (UK) for pressure inlet valves for the wheel brake cylinders; and hydraulic model means for providing estimated values (PS) for a following control time step of the brake cylinder pressure for a respective brake circuit from a brake circuit pressure (PK) of the following control time step and from the actual activation times (UK) of the inlet valves associated with the individual brake cylinders of a respective brake circuit; the improvement wherein: a pump is provided in said hydraulic system for the production of the brake circuit pressure, with said pump being set into action when pressure build-up is required and then delivering a defined volume flow; and means are provided for estimating said brake circuit pressure (PK) of the following control time step for each brake circuit from a relationship of the determined actual valve actuation times (UK), the measured inlet brake cylinder pressure ($P_{inl}$) applied by the driver of the vehicle, the estimated actual brake cylinder pressures (PS), and vehicle specific constants when pressure build-up is required in at least one of the two wheel brakes of a brake circuit, and otherwise from a relationship of the inlet pressure ($P_{inl}$) and at least one of the vehicle constants, with this relationship being applicable to at least one of the two wheel brakes of a brake circuit.

2. A vehicle brake pressure control system as defined in claim 1, wherein said pump, when set into action because pressure build-up is required, then delivers a constant volume flow; and wherein said means for estimating estimates said brake circuit pressure PK for each brake circuit in accordance with the relationship $$PK_{k+1}=PK_k+a_1-a_2*UK1(PK_k-PS1_k)-a_3*UK2(PK_k-PS2_k)+P_{inl}$$

if pressure build-up is required in at least one of the two wheel brakes of a brake circuit, and otherwise according to the relationship $$PK_{k+1}=a_4*PK_k+a_5+P_{inl}$$

with this relationship being applicable to at least one of the two wheel brakes, and with UK1 and UK2 being the determined valve activation times of the respective inlet valves forming part of the brake circuit, PS1 and PS2 being the estimated pressures in the associated wheel brake cylinders, $a_1$ to $a_5$ being the vehicle specific constants, and k being the time.

3. A vehicle brake pressure control system as defined in claim 2, wherein said relationship for pressure buildup is expanded by the term $+a_6 PK^2_k$.

4. A vehicle brake pressure control system as defined in claim 1, further comprising means for setting said pump into action when pressure build-up is required.

5. In a method of controlling brake pressure at two wheel brake cylinders of a brake circuit of a vehicle, with said method including measuring the inlet brake cylinder pressure ($P_{inl}$) applied by a driver of the vehicle, determining desired actual brake pressure values ($P_{des}$) for respective wheel brake cylinders based on measured and estimated values including estimated actual values of the wheel brake cylinder pressures (PS), and estimating the values of the wheel brake cylinder pressures (PS) of a following control time step from a brake circuit pressure (PK) of a following control time step and actual activation times (UK) of inlet valves associated with the individual brakes of the brake circuit; the improvement comprising: controlling a pump for the production of the brake circuit pressure such that said pump is set into action when pressure build-up is required and then delivers a defined volume flow in the respective brake circuit; and estimating said brake circuit pressure (PK) of the following control time step for each said brake circuit from a relationship of the determined actual valve actuation times (UK), the measured inlet brake cylinder pressure ($P_{inl}$) applied by the driver of the vehicle, the estimated actual brake cylinder pressures (PS), and vehicle specific constants if pressure build-up is required in at least one of the two wheel brakes of a brake circuit, and otherwise from a relationship of the inlet pressure (Pinl) and at least one of the vehicle constants, with this relationship being applicable to at least one of the two wheel brakes of a brake circuit.

6. A Method of controlling brake pressure as defined in claim 1, wherein said pump, when set into action because pressure build-up is required, then delivers a constant volume flow; and wherein the step of estimating includes estimating said brake circuit pressure PK for each brake circuit in accordance with the relationship $$PK_{k+1}=PK_k+a_1-a_2*UK1(PK_k-PS1_k)-a_3*UK_2(PK_k-PS2_k)+P_{inl}$$

if pressure build-up is required in at least one of the two wheel brakes of the respective said brake circuit, and otherwise according to the relationship $$PK_{k+1}=a_4*PK_k+a_5+P_{inl}$$

which is applicable to at least one of the two wheel brakes, where UK1 and UK2 are valve activation times of the respective inlet valves forming part of the brake circuit, PS1 and PS2 are the estimated pressure values in the associated wheel brake cylinders, $P_{inl}$ is a measured brake cylinder pressure provided by a driver of the vehicle, $a_1$ to $a_5$ are the vehicle specific constants, and k is a time.

7. A method of controlling brake pressure as defined in claim 6, wherein said relationship for pressure buildup is expanded by the term $+a_6 \, PK^2_k$.

8. A method of controlling brake pressure as defined in claim 5, further comprising: determining the actual actuation times (UK) for the inlet valves for the wheel brake cylinders of the brake circuit from the desired actual brake pressure values ($P_{des}$); and applying the actual actuation times (UK) to the pressure inlet valves for the wheel brake cylinders of the brake circuit.

* * * * *